United States Patent
Ma et al.

(10) Patent No.: US 9,741,363 B2
(45) Date of Patent: Aug. 22, 2017

(54) LASER POWER OPTIMIZATION FOR HEAT ASSISTED INTERLACED MAGNETIC RECORDING

(71) Applicant: Seagate Technology LLC, Cupertino, CA (US)

(72) Inventors: Minjie Ma, Bloomington, MN (US); Kaizhong Gao, North Oaks, MN (US); Edward Gage, Lakeville, MN (US); Tim Rausch, Farmington, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/806,358

(22) Filed: Jul. 22, 2015

(65) Prior Publication Data
US 2016/0148636 A1    May 26, 2016

Related U.S. Application Data

(60) Provisional application No. 62/083,696, filed on Nov. 24, 2014, provisional application No. 62/083,732, filed on Nov. 24, 2014.

(51) Int. Cl.
| | | |
|---|---|---|
| *G11B 5/02* | (2006.01) | |
| *G11B 5/09* | (2006.01) | |
| *G11B 5/012* | (2006.01) | |
| *G11B 20/18* | (2006.01) | |
| *G11B 11/105* | (2006.01) | |
| *G11B 5/00* | (2006.01) | |
| *G11B 20/12* | (2006.01) | |

(Continued)

(52) U.S. Cl.
CPC ............ *G11B 5/09* (2013.01); *G11B 5/012* (2013.01); *G11B 20/1217* (2013.01); *G11B 20/1833* (2013.01); *G11B 5/59633* (2013.01); *G11B 5/59638* (2013.01); *G11B 5/6088* (2013.01); *G11B 11/10506* (2013.01); *G11B 11/10515* (2013.01); *G11B 11/10521* (2013.01); *G11B 11/10595* (2013.01); *G11B 20/12* (2013.01); *G11B 2005/0021* (2013.01); *G11B 2020/1222* (2013.01); *G11B 2020/1238* (2013.01); *G11B 2020/1292* (2013.01)

(58) Field of Classification Search
None
See application file for complete search history.

(56) References Cited

U.S. PATENT DOCUMENTS

| | | | |
|---|---|---|---|
| 4,030,130 A | 6/1977 | Smith | |
| 4,152,736 A | 5/1979 | Jansen et al. | |

(Continued)

FOREIGN PATENT DOCUMENTS

| | | |
|---|---|---|
| EP | 0484774 A2 | 5/1992 |
| EP | 1564736 | 8/2005 |

(Continued)

*Primary Examiner* — Brian Butcher
(74) *Attorney, Agent, or Firm* — Holzer Patel Drennan

(57) ABSTRACT

A storage device disclosed herein stores data on a storage media using interlaced magnetic recording (IMR) and it includes a storage controller configured to determine power levels applied to the power source such that power levels applied to heat various tracks can be different from each other. An implementation of the storage device determines the track density, linear densities and power levels for even and odd tracks in IMR HAMR for the storage media.

20 Claims, 13 Drawing Sheets

(51) Int. Cl.
*G11B 5/596* (2006.01)
*G11B 5/60* (2006.01)

(56) References Cited

U.S. PATENT DOCUMENTS

| | | | |
|---|---|---|---|
| 4,298,897 A | 11/1981 | Arter et al. |
| 4,535,372 A | 8/1985 | Yeakley |
| 4,622,601 A | 11/1986 | Isozaki et al. |
| 4,646,168 A | 2/1987 | Sonobe et al. |
| 4,771,346 A | 9/1988 | Shoji et al. |
| 4,803,571 A | 2/1989 | Fujioka et al. |
| 4,853,799 A | 8/1989 | Aikawa |
| 5,010,430 A | 4/1991 | Yamada et al. |
| 5,285,341 A | 2/1994 | Suzuki et al. |
| 5,402,270 A | 3/1995 | McDonnell et al. |
| 5,760,993 A | 6/1998 | Purkett |
| 5,892,634 A | 4/1999 | Ito et al. |
| 5,978,168 A | 11/1999 | Mathews et al. |
| 6,052,797 A | 4/2000 | Ofek et al. |
| 6,104,562 A | 8/2000 | Ottesen et al. |
| 6,185,063 B1 | 2/2001 | Cameron |
| 6,710,960 B1 | 3/2004 | Yorimitsu |
| 6,768,605 B2 | 7/2004 | Yamamoto |
| 7,130,152 B1 | 10/2006 | Raymond et al. |
| 7,259,927 B2 | 8/2007 | Harris |
| 7,393,066 B2 | 7/2008 | Dugas et al. |
| 7,440,222 B2 | 10/2008 | Nakamura et al. |
| 7,508,619 B2 | 3/2009 | Okamoto et al. |
| 7,573,682 B2 | 8/2009 | Pust et al. |
| 7,872,829 B2 | 1/2011 | Sakai |
| 7,907,360 B2 | 3/2011 | Mak et al. |
| 7,957,093 B2 | 6/2011 | Brand |
| 7,965,465 B2 | 6/2011 | Sanvido et al. |
| 8,023,215 B1 | 9/2011 | Ghaly et al. |
| 8,139,318 B2 | 3/2012 | Biskeborn |
| 8,310,777 B2 | 11/2012 | Biskeborn et al. |
| 8,310,782 B2 | 11/2012 | Song et al. |
| 8,531,792 B1 | 9/2013 | Burd et al. |
| 8,531,793 B2 | 9/2013 | Bandic et al. |
| 8,537,481 B1 | 9/2013 | Bandic |
| 8,599,510 B1 | 12/2013 | Fallone |
| 8,693,123 B1 | 4/2014 | Guo et al. |
| 8,699,159 B1 | 4/2014 | Malina |
| 8,699,162 B1 | 4/2014 | Grobis et al. |
| 8,711,517 B2 | 4/2014 | Erden et al. |
| 8,854,752 B2 | 10/2014 | Jin et al. |
| 8,867,161 B2 | 10/2014 | Emo et al. |
| 8,873,178 B2 | 10/2014 | Erden et al. |
| 8,913,335 B2 | 12/2014 | Coker et al. |
| 8,917,469 B1 | 12/2014 | Guo et al. |
| 8,929,186 B1 * | 1/2015 | Sharma | G11B 5/012 369/47.5 |
| 8,976,478 B1 | 3/2015 | Harllee, III et al. |
| 9,053,712 B1 | 6/2015 | Guo et al. |
| 9,058,829 B1 | 6/2015 | Wolf et al. |
| 9,082,458 B1 | 7/2015 | Tang |
| 9,087,541 B1 | 7/2015 | Pokharel et al. |
| 9,099,103 B1 | 8/2015 | Krichevsky |
| 9,105,302 B1 | 8/2015 | Erden et al. |
| 9,111,575 B1 | 8/2015 | Zhou et al. |
| 9,111,578 B1 | 8/2015 | Hassel et al. |
| 9,129,658 B1 | 9/2015 | Yamamoto |
| 9,142,232 B2 | 9/2015 | Edelman et al. |
| 9,142,246 B1 | 9/2015 | Trantham et al. |
| 9,153,287 B1 | 10/2015 | Hamilton et al. |
| 9,324,362 B1 | 4/2016 | Gao |
| 9,396,062 B1 | 7/2016 | Sridhara et al. |
| 9,418,688 B1 | 8/2016 | Rausch et al. |
| 2002/0035666 A1 | 3/2002 | Beardsley et al. |
| 2002/0035704 A1 | 3/2002 | Wilson |
| 2002/0105867 A1 | 8/2002 | Tamaru et al. |
| 2003/0214886 A1 | 11/2003 | Sakamoto et al. |
| 2005/0078399 A1 | 4/2005 | Fung et al. |
| 2005/0157597 A1 | 7/2005 | Sendur et al. |
| 2006/0215511 A1 | 9/2006 | Shin et al. |
| 2007/0047415 A1 | 3/2007 | Chang |
| 2007/0050593 A1 | 3/2007 | Chen et al. |
| 2007/0174582 A1 | 7/2007 | Feldman |
| 2008/0002272 A1 | 1/2008 | Riedel |
| 2008/0239901 A1 | 10/2008 | Tsunokawa et al. |
| 2008/0316639 A1 | 12/2008 | Tang et al. |
| 2009/0244775 A1 | 10/2009 | Ehrlich |
| 2009/0251821 A1 | 10/2009 | Song et al. |
| 2010/0014183 A1 | 1/2010 | Aoki et al. |
| 2010/0027406 A1 | 2/2010 | Krause et al. |
| 2010/0271727 A1 | 10/2010 | Namkoong et al. |
| 2010/0321817 A1 | 12/2010 | Aida et al. |
| 2012/0014013 A1 | 1/2012 | Bandic et al. |
| 2012/0194946 A1 | 8/2012 | Watanabe et al. |
| 2013/0148225 A1 | 6/2013 | Coker et al. |
| 2013/0155826 A1 | 6/2013 | Zhang et al. |
| 2013/0294207 A1 | 11/2013 | Erden et al. |
| 2014/0016224 A1 | 1/2014 | Unoki et al. |
| 2014/0043708 A1 | 2/2014 | Erden et al. |
| 2014/0055881 A1 | 2/2014 | Zaharris |
| 2014/0153134 A1 | 6/2014 | Han et al. |
| 2014/0160589 A1 | 6/2014 | Deki et al. |
| 2014/0285923 A1 | 9/2014 | Aoki et al. |
| 2014/0327983 A1 | 11/2014 | Biskeborn et al. |
| 2015/0178161 A1 | 6/2015 | Burd et al. |
| 2016/0148630 A1 | 5/2016 | Rausch |
| 2016/0148635 A1 | 5/2016 | Zhu et al. |
| 2016/0148636 A1 | 5/2016 | Ma et al. |
| 2016/0148637 A1 | 5/2016 | Rausch et al. |
| 2016/0148642 A1 | 5/2016 | Gao |
| 2016/0148643 A1 | 5/2016 | Gao et al. |
| 2016/0148644 A1 | 5/2016 | Zhu et al. |
| 2016/0148645 A1 | 5/2016 | Zhu et al. |

FOREIGN PATENT DOCUMENTS

| | | | |
|---|---|---|---|
| JP | 02240862 A | 9/1990 |
| WO | 2005-030869 A1 | 4/2005 |

* cited by examiner

LASER POWER OPTIMIZATION FOR HEAT ASSISTED INTERLACED MAGNETIC RECORDING

CROSS-REFERENCE TO RELATED APPLICATIONS

The present application claims benefit of priority to U.S. Provisional Application No. 62/083,696, entitled "Interlaced Magnetic Recording in HAMR Devices" and filed on Nov. 24, 2014, and also to U.S. Provisional Patent Application No. 62/083,732, entitled "Interlaced Magnetic Recording" and filed on Nov. 24, 2014. Both of these applications are specifically incorporated by reference for all that they disclose or teach.

BACKGROUND

As requirements for data storage density increase for magnetic media, cell size decreases. A commensurate decrease in the size of a write element is difficult because in many systems, a strong write field gradient is needed to shift the polarity of cells on a magnetized medium. As a result, writing data to smaller cells on the magnetized medium using the relatively larger write pole may affect the polarization of adjacent cells (e.g., overwriting the adjacent cells). One technique for adapting the magnetic medium to utilize smaller cells while preventing adjacent data from being overwritten during a write operation is shingled magnetic recording (SMR).

SMR allows for increased areal density capability (ADC) as compared to conventional magnetic recording (CMR) but at the cost of some performance ability. As used herein, CMR refers to a system that allows for random data writes to available cells anywhere on a magnetic media. In contrast to CMR systems, SMR systems are designed to utilize a write element with a write width that is larger than a defined track pitch. As a result, changing a single data cell within a data track entails re-writing a corresponding group of shingled (e.g., sequentially increasing or decreasing) data tracks.

Therefore, better designs are desired to increase storage device performance while achieving or improving upon the ADC of existing SMR systems.

SUMMARY

A storage device disclosed herein stores data on a storage media using interlaced magnetic recording (IMR) and it includes a storage controller configured to determine power levels applied to the power source such that power levels applied to heat various tracks of different track densities are different from each other. An implementation of the storage device determines different linear densities for tracks with different track densities for the storage media.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

DETAILED DESCRIPTION

Figure 1:
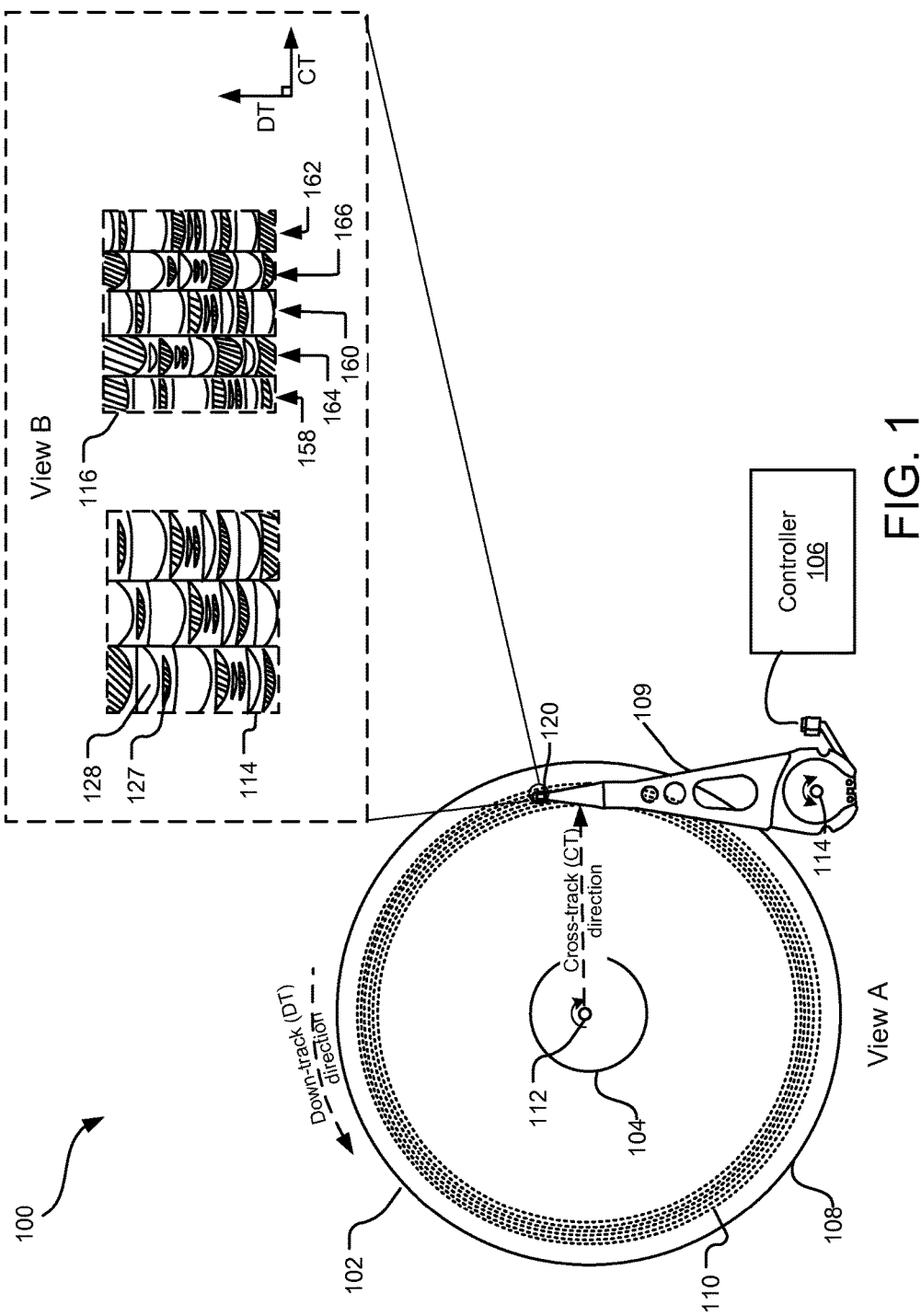
FIG. 1 illustrates a data storage device including a transducer head assembly for writing data on a magnetic storage medium.

FIG. 1 illustrates a data storage device 100 including a transducer head assembly 120 for writing data on a magnetic storage medium 108. Although other implementations are contemplated, the magnetic storage medium 108 is, in FIG. 1, a magnetic storage disc on which data bits can be recorded using a magnetic write pole and from which data bits can be read using a magnetoresistive element (not shown). As illustrated in View A, the storage medium 108 rotates about a spindle center or a disc axis of rotation 112 during rotation, and includes an inner diameter 104 and an outer diameter 102 between which are a number of concentric data tracks 110. Information may be written to and read from data bit locations in the data tracks on the storage medium 108.

The transducer head assembly 120 is mounted on an actuator assembly 109 at an end distal to an actuator axis of rotation 114. The transducer head assembly 120 flies in close proximity above the surface of the storage medium 108 during disc rotation. The actuator assembly 109 rotates during a seek operation about the actuator axis of rotation 114. The seek operation positions the transducer head assembly 120 over a target data track for read and write operations.

The transducer head assembly 120 includes at least one write element (not shown) that further includes a write pole for converting a series of electrical pulses sent from a controller 106 into a series of magnetic pulses of commensurate magnitude and length. The magnetic pulses of the write pole selectively magnetize magnetic grains of the rotating magnetic media 108 as they pass below the pulsating write element.

View B illustrates magnified views 114 and 116 of a same surface portion of the storage media 108 according to different write methodologies and settings of the data storage device 100. Specifically, the magnified views 114 and 116 include a number of magnetically polarized regions, also referred to herein as "data bits," along the data tracks of the storage media 108. Each of the data bits (e.g., a data bit 127) represents one or more individual data bits of a same state (e.g., 1s or 0s). For example, the data bit 128 is a magnetically polarized region representing multiple bits of a first state (e.g., "000"), while the adjacent data bit 127 is an oppositely polarized region representing one or more bits of a second state (e.g., a single "1"). The data bits in each of the magnified views 114 and 116 are not necessarily illustrative of the actual shapes or separations of the bits within an individual system configuration.

The magnified view 114 illustrates magnetic transitions recorded in a given data zone according to a conventional magnetic recording (CMR) technique. In a CMR system, all written data tracks are randomly writeable and of substantially equal width within the same data zone. However, within a different data zone, the track width may be different.

According to one implementation, aspects of the disclosed technology are implemented in a CMR system to improve drive performance. In particular, certain aspects of the disclosed technology provide for directed writes to specific data tracks based on a drive or region capacity. The same or other aspects of the disclosed technology may also be implemented in non-CMR systems such as an interlaced magnetic recording (IMR) system exemplified in the magnified view 116.

The IMR system shown in the magnified view 116 illustrates alternating data tracks of two different written track widths. A first series of alternating tracks (e.g., the tracks 158, 160, and 162) have a wider written track width than a second series of interlaced data tracks (e.g., 164 and 166). In one implementation, each data track of the first series of alternating data tracks (e.g., the data track 160) is written before the immediately adjacent data tracks of the second series (e.g., 164 and 166).

According to one implementation, data of the second series (e.g., 164, 166) is of a lower linear density (e.g., along-track density) than data of the first series (e.g., 158, 160, and 162). Other implementations utilize more than two different linear densities to write data. The IMR technique illustrated in the magnified view 116 provides for a higher total areal density capability (ADC) with a lower observable bit error rate (BER) than CMR systems.

To write new data to the magnetic storage medium 108, a storage controller 106 of the storage device 100 selects a storage location based according to a number of prioritized random access (PRA) rules. For example, the controller 106 selects storage locations for each incoming write command to systematically maximize a total number of possible random writes, to improve drive performance, etc. If the system 100 is a CMR system, the storage controller 106 may write data tracks in an order that maximizes a number of random writes on the storage medium 108. If the system 100 is an IMR system, the storage controller 106 may write to different (e.g., interlaced) data tracks on the magnetic storage medium 108 with different linear densities and written track widths.

In at least one implementation, the storage medium 108 is divided radially into zones and each zone is associated with multiple linear densities and/or written track widths. For example, two or more different linear densities may be used to write data of alternating tracks within each individual radial zone. The linear densities employed in one radial zone may differ from the linear densities employed in any other radial zone of the storage medium 108.

The controller 106 includes software and/or hardware, and may be implemented in any tangible computer-readable storage media within or communicatively coupled to the storage device 100. The term "tangible computer-readable storage media" includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by mobile device or computer. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal.

Figure 2:
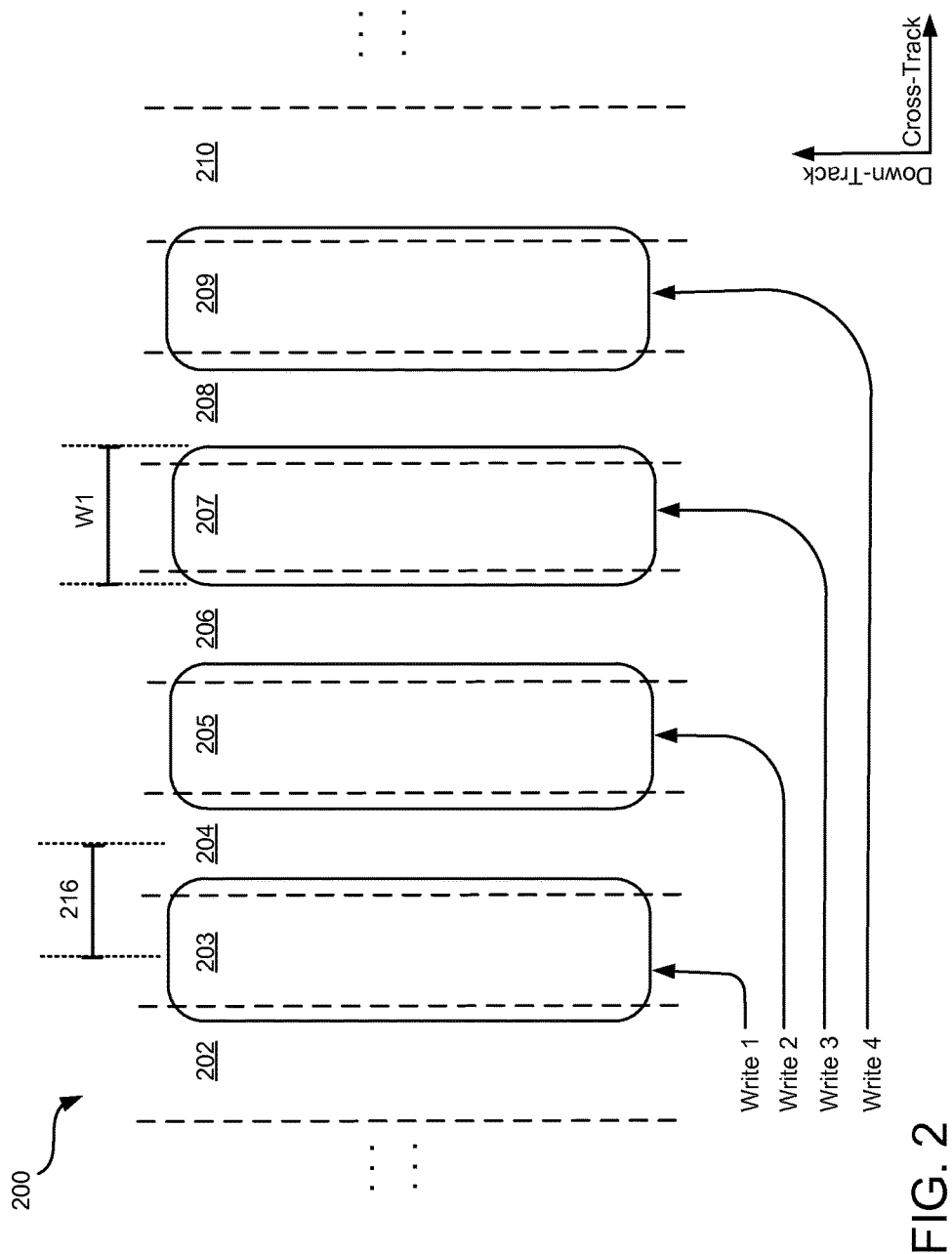
FIG. 2 illustrates example data writes to a magnetic disc in an interlaced magnetic recording (IMR) system.

FIG. 2 illustrates example data writes in an IMR system. The magnetic disc 200 includes a number of substantially circular data tracks (e.g., data tracks 202-210). A controller (not shown) selects data tracks to receive and store incoming data.

In FIG. 2, the dotted lines indicate boundaries between adjacent data tracks having a same track pitch 216 (e.g., distance between centers of adjacent data tracks). In one implementation, a same or substantially equal track pitch is employed across an entire surface of the magnetic disc 200. However, the track pitch 216 of each data track is smaller than a written track width (W1), (e.g., an actual width of recorded data bits in the cross-track direction) for data written to a first plurality of alternating data tracks 203, 205, 207, and 209.

In various implementations, the first plurality of alternating data tracks (e.g., 203, 205, 207, and 209) includes either exclusively even-numbered tracks or exclusively odd-numbered tracks. Tracks interlaced with the first plurality of alternating data tracks have a narrower written track width (e.g., less than W1) and, by convention, overwrite the edges of data bits stored in the immediately adjacent to data tracks of wider written width.

To simplify nomenclature, the first plurality of data tracks (e.g., those tracks written with a wider bit footprint) are shown and are also referred to herein as "odd-numbered" or "bottom" data tracks. Similarly, those tracks with lower bit footprint are referred to herein as the "even-numbered" or "top" tracks. It should be understood, however, that the odd-numbered tracks may, in practice, be even-numbered tracks and vice versa. In at least one implementation, the interlaced (e.g., odd-numbered) data tracks are written with a higher linear density than the even-numbered data tracks.

In one implementation, data is written to alternating data tracks in a region of the storage media 200 before any data is written to the interlaced tracks between the alternating data tracks. In FIG. 2, the data tracks of wider written track width (203, 205, 207, and 209) are written to before the interlaced tracks of narrower written track width (e.g., 202, 204, 206, 208, and 210). So long as there is a spacing (e.g., a blank track) between each data track including data, there is no risk of data loss due to ATI.

Figure 3:
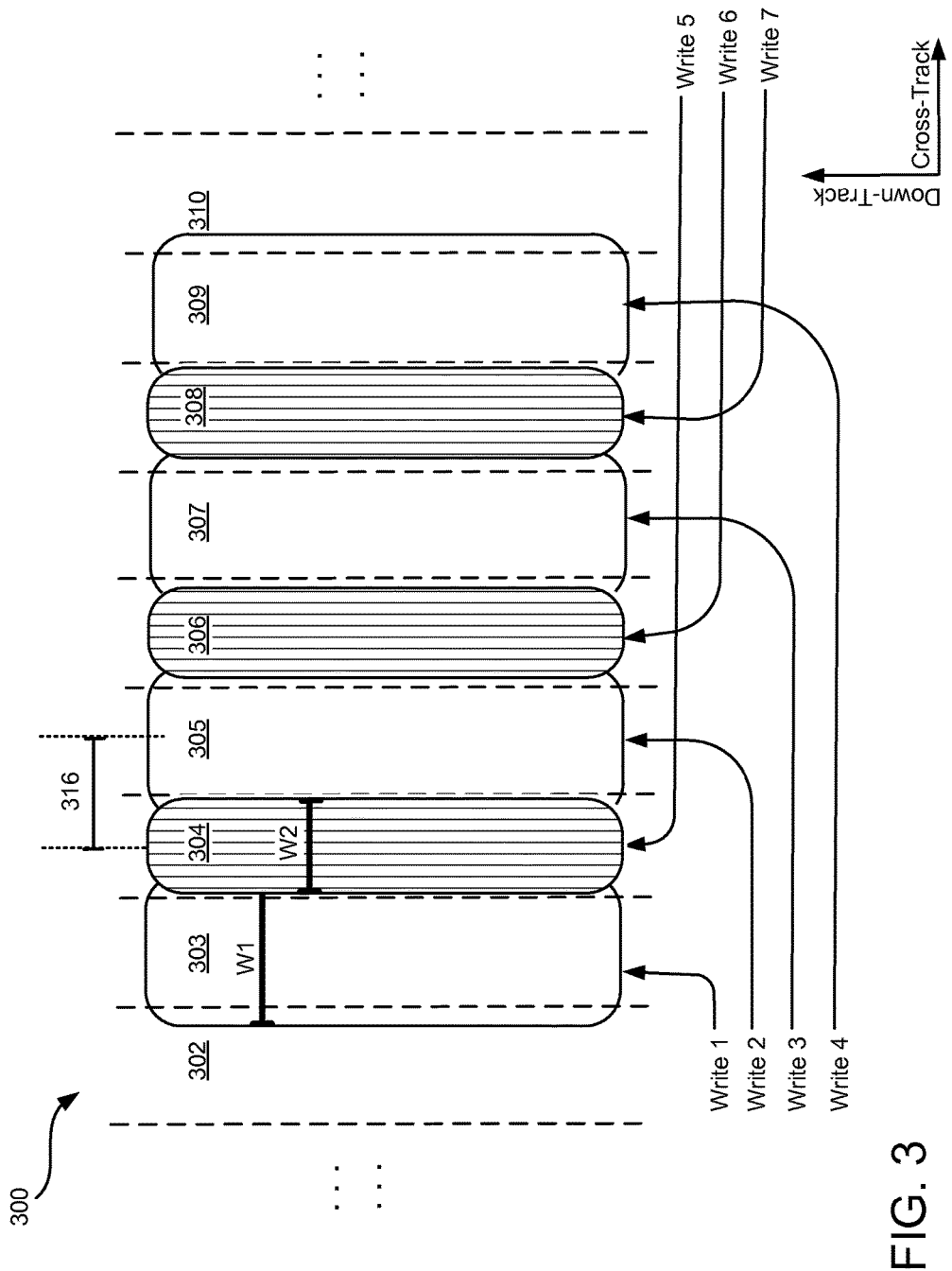
FIG. 3 illustrates another example of data writes to a magnetic disc in an IMR system.

FIG. 3 illustrates example data writes to a magnetic disc 300 employing another PRA scheme in an IMR system. The magnetic disc 300 includes a number of circular data tracks (e.g., data tracks 302-310). A controller (not shown) selects data tracks to receive and store incoming data. In one implementation, the controller directs the incoming data writes to a series of alternating data tracks (e.g., odd-numbered data tracks 303, 305, 307, and 309) for a period of time until a first capacity condition is satisfied. During this time period, data tracks interlaced (e.g., the even-numbered data tracks) with the alternating data tracks are left blank.

In FIG. 3, a written track width W2 of the even-numbered data tracks is less than or approximately equal to a defined track pitch 316 (e.g., a spacing between a center of an even-numbered data track and an adjacent odd-numbered data track). A written track width W1 of the odd-numbered data tracks is greater than the defined track pitch 316. In one implementation, a ratio of track width of odd-numbered data tracks to the track width of even-numbered data tracks (W1/W2) is between 1.2/1 and 2/1. Other implementations are also contemplated.

In the illustrated system, a data write to any of the interlaced (e.g., even-numbered data tracks) overwrites and effectively "trims" edges of adjacent odd-numbered tracks. For example, the data track 304 overwrites edges of the data tracks 303 and 305 in narrow overlap regions where the data of data tracks 303 and 505 "bleeds" over the natural track boundaries. Consequently, data bits of the narrow data track 304 may overwrite the right-most edges of data bits of the wider written data track 303 and the left-most edges of data bits of the wider written data track 305. Even though each of the narrow written data tracks overwrites the edge portions of data in the adjacent wider written data tracks, a readable portion of the data of the wider written tracks is retained in the center region of each of the wider written data tracks. Therefore, a bit error rate (BER) of the wider written data tracks 303 and 305 may be substantially unaltered by the data write to the data track 504.

In at least one implementation, the wider written data tracks (e.g., the odd-numbered data tracks) include data stored at a higher linear density compared to the linear density of CMR tracks with same track density and written by the same writing configuration. This allows for an increase in total ADC as compared to CMR.

Notably, a random re-write of the data of one of the wider written data tracks (e.g., the data track 303) may overwrite and substantially affect readability of data in adjacent even-numbered data tracks (e.g., the data track 302). Therefore, a data management method utilizing PRA rules is employed to ensure that groupings of adjacent data tracks are written in an order such that all data of all tracks are readable and total read/write processing time is mitigated.

According to one implementation, a data management method includes multiple phases, with different PRA rules applicable during each phase. The data management method may govern data writes to the entire magnetic disc 300, or (alternatively) govern data writes to a subset of the magnetic disc 300, such as a radial zone of the magnetic disc 300.

In a first phase, data is written exclusively to alternating tracks at a high linear density. For example, the odd-numbered data tracks with a wide written track width may be written to sequentially, as illustrated by the notation "write 1", "write 2", "write 3" and "write 4" in FIG. 3. This first phase continues until a first capacity condition is satisfied. For example, the first capacity condition may be satisfied when 50% of the data tracks in a region (e.g., a specific radial or zone or the entire disc surface) store data. During this first phase of the data management method, each of the odd-numbered data tracks can be written to at random and directly overwritten without re-writing any data of adjacent data tracks.

After the first capacity condition is satisfied, a second phase of the data management method commences. During the second phase of the data management method, data writes may be directed to even-numbered data tracks. The even-numbered data tracks (304, 306, 308) are written to at a lower linear density (e.g., narrower track width), and may be individually written at random (e.g., without re-writing data of any adjacent data tracks).

During the second phase, some odd-numbered data tracks may be written to randomly and others may not. For example, the data track 303 remains randomly writeable up until the point in time when data is first written to either of adjacent data tracks 302 or 304. If an odd-numbered data track is bounded by a data track including data, the odd-numbered data track is no longer randomly writeable. For example, updating data of the data track 303 may entail reading, caching, and subsequently re-writing the data of the adjacent data tracks 302 and 304 (if 302 and 304 contain data).

In one implementation, every other even-numbered data track is left blank for a period of time while the disk continues to fill up. For example, data is initially written to tracks 304 and 308 (per "write 5" and "write 6", respectively), but no data is written to any of tracks 302, 306, or 310. So long as every-other even-numbered data track is left blank, non-random data writes entail writing no more than two data tracks at once. For example, overwriting the data track 303 entails (1) reading data track 302 to a temporary cache location; (2) writing the data track 303; and (3) re-writing the data track 302 after the write of data track 303 is complete.

The IMR system of writing data to the disc 300 may be implemented together with heat assisted magnetic recording (HAMR). HAMR generally refers to the concept of locally heating a recording medium to reduce the coercivity. This allows the applied magnetic writing fields to more easily direct the magnetization during the temporary magnetic softening caused by the heat source. HAMR allows for the use of small grain media, with a larger magnetic anisotropy at room temperature to assure sufficient thermal stability, which is desirable for recording at increased areal densities. HAMR can be applied to any type of magnetic storage media including tilted media, longitudinal media, perpendicular media, and patterned media. A number of different energy sources may be used to heat the media, including laser, electric current, etc. In a system using laser, a laser diode generates a laser beam that is pointed to a storage location using a waveguide. Typically, the power level of the laser beam is controlled by controlling the operating laser diode current ($I_{op}$) applied to the laser diode.

By heating the media, the $K_u$ or coercivity of media is reduced such that the magnetic write field is sufficient to write to the media. Once the media cools to ambient temperature, the coercivity has a sufficiently high value to assure thermal stability of the recorded information. The implementation of IMR in HAMR can increase HAMR area density capacity (ADC). In a conventional HAMR system, the maximum ADC is achieved using a variable bit aspect ratio (VBAR) sweep to set the $I_{op}$. However, when HAMR is used in IMR, there are unlimited combination of even track $I_{op}$ and odd track $I_{op}$ that can be used in an IMR scheme. The method and system disclosed herein allows achieving high level of ADC in IMR-HAMR. Specifically, a method and system disclosed herein provides an optimization algorithm that may be used by a storage controller to achieve maximum ADC.

In HAMR devices, one may get the maximum ADC through variable bit aspect ratio (VBAR) sweep that sets the operating laser diode current (LDI $I_{op}$). However, for a HAMR device using IMR, there are unlimited combinations of even track $I_{op}$ and odd track $I_{op}$. In other words, for each even track $I_{op}$ a large number of odd track $I_{op}$ may be used and vice-versa. Therefore, it becomes technically extremely difficult to determine the combination of $I_{op}$ and $I_{op}$ that provides the optimal ADC. Implementations disclosed herein provide a laser power optimization method that allows achieving such optimal ADC. For example, such optimal ADC may be the highest ADC for the HAMR-IMR device.

Figure 4:
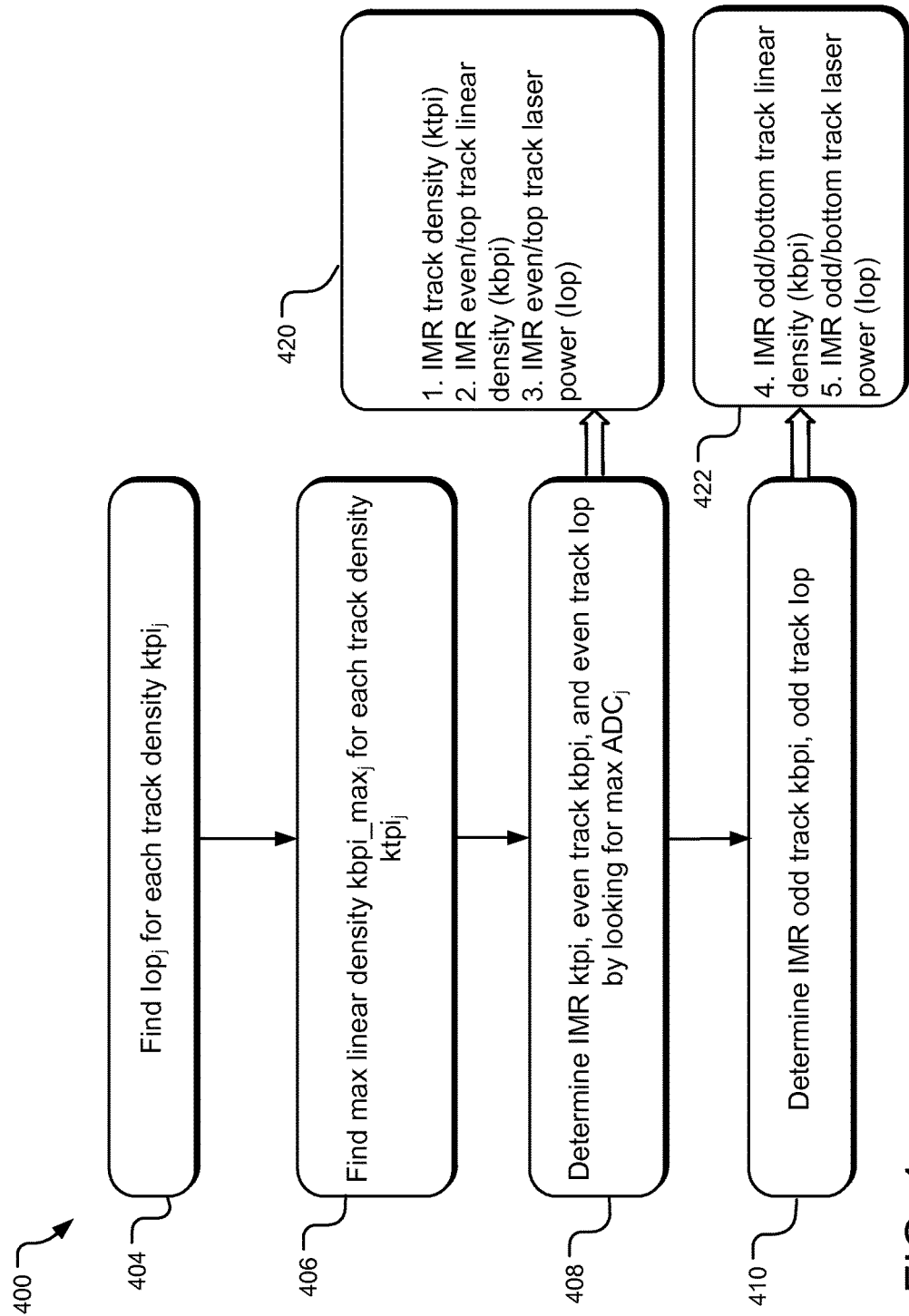
FIG. 4 illustrates an example flowchart of a laser power optimization algorithm in an IMR heat assisted magnetic recording (HAMR) to achieve better area density capacity (ADC).

FIG. 4 illustrates an example flowchart 400 of a power optimization algorithm in IMR-HAMR to achieve better area density capacity (ADC). Each of the various operations 404-410 are explained in further detail in FIGS. 5-8. Specifically, the operations disclosed in FIG. 4 allows determining the five key parameters for an IMR system. Firstly, an operation 404 finds Iopj for each track density ktpij (kilotracks per inch). Specifically, operation 404 may include first selecting kbpi0 (kilobits per inch) and then sweeping ktpij between ktpi_min and ktpi_max to find Iopj for each ktpij.

An operation 406 finds maximum linear density kbpi_$max_j$ for each track density $ktpi_j$. Subsequently, an operation 408 determines IMR ktpi, even track kbpi, and even track Iop by looking for max $ADC_j$. Wherein, the $ADC_j$ may be determined as:

$$ADC_j = ktpi_j \times kbpi\_max_j$$

Operation 408 generates three of the five output parameters 420, namely: IMR track density (ktpi), IMR even/top track linear density (kbpi), and IMR even/top track laser power (Iop).

Subsequently, an operation 410 determines IMR odd track parameters 422, namely IMR odd/bottom track linear density (kbpi) and IMR odd/bottom track laser power (Iop).

Figure 5:
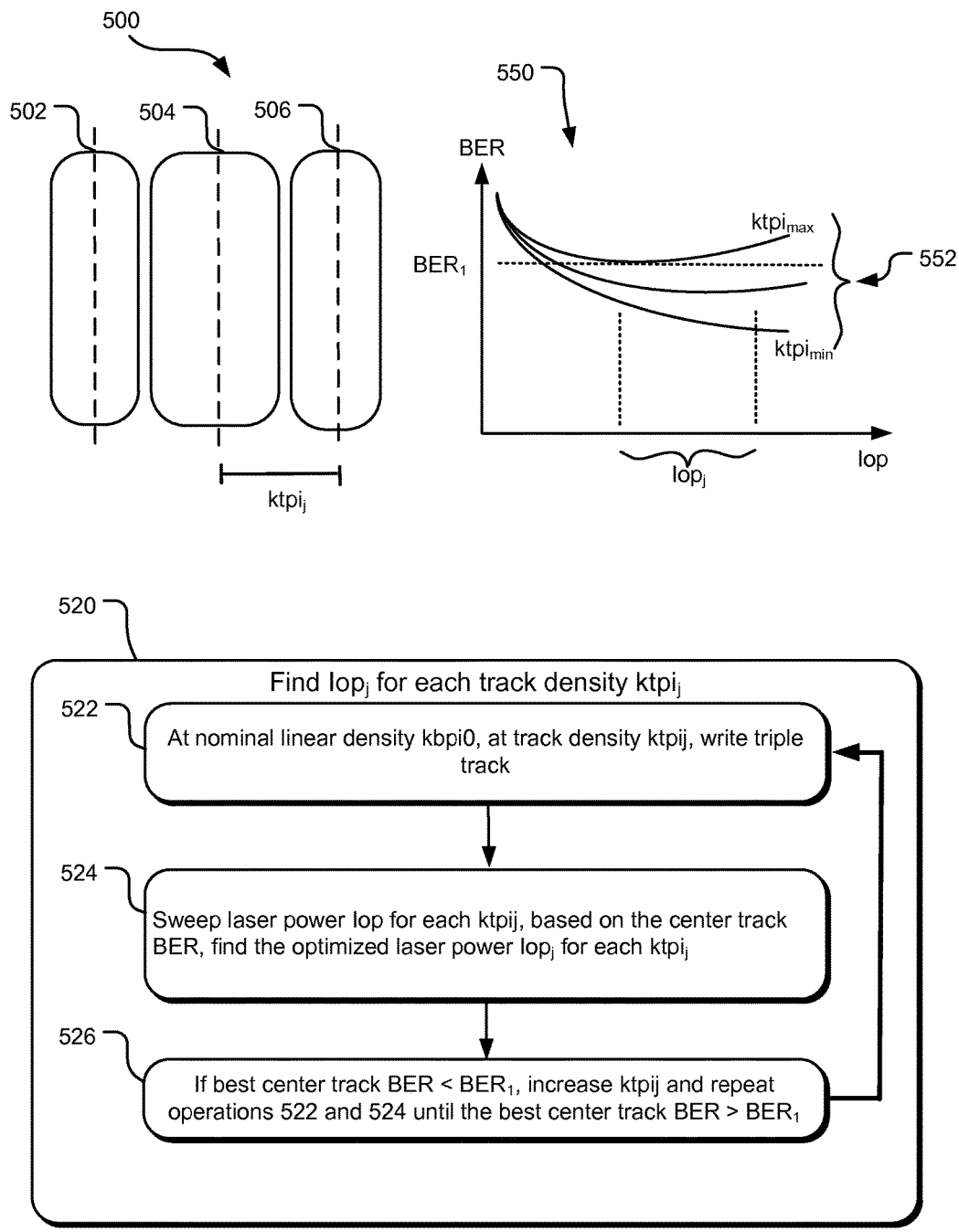
FIG. 5 illustrates example operations for finding optimal laser power for various track densities.

FIG. 5 illustrates operation 404 in further detail. Specifically, FIG. 5 illustrates operations 520 for IMR triple tracks 500, where the track pitch of the IMR triple tracks 500 is $ktpi_j$. The IMR triple tracks 500 include a center track 504 and two adjacent tracks 502 and 506. The adjacent tracks can be written multiple times to build in robustness against adjacent track interference. For example, center track 504 is written once and then adjacent tracks 502 and 506 are written multiple times. An operation 522 writes the triple tracks 500 at a nominal linear density of $kbpi_0$ and at a track density of $ktpi_j$. Specifically, the operation 522 performs the triple track write in a specific order where the center track 504 is written first and then the adjacent tracks 502 and 506 are written with the corresponding track pitch and same laser power as used to write the center track 502.

An operation 524 sweeps laser power Iop for a given value of $ktpi_j$ over a range of $Iop_j$ to find an optimized $Iop_j$ that results in the lowest value of bit error rate (BER) of 504 for the selected value of $ktpi_j$. This operation is described in further detail in a graph 550 wherein each of the lines 552 illustrates various a sweep of Iop for a given value of $ktpi_j$. An operation 526 sweeps the $ktpi_j$ and compares the resulting value of center track BER of 504 for a given $ktpi_j$ with a threshold $BER_1$, and if the if the observed BER for a given $ktpi_j$ is below the $BER_1$ (BER<$BER_1$), it increases the $ktpi_j$ and repeats the operations 522 and 524 until the center track BER is above $BER_1$ (BER>$BER_1$). If it is determined that for $ktpi_k$ BER>$BER_1$, then the max track density $ktpi_{max}$ is determined to be equal to the $ktpi_{k-1}$.

Figure 6:
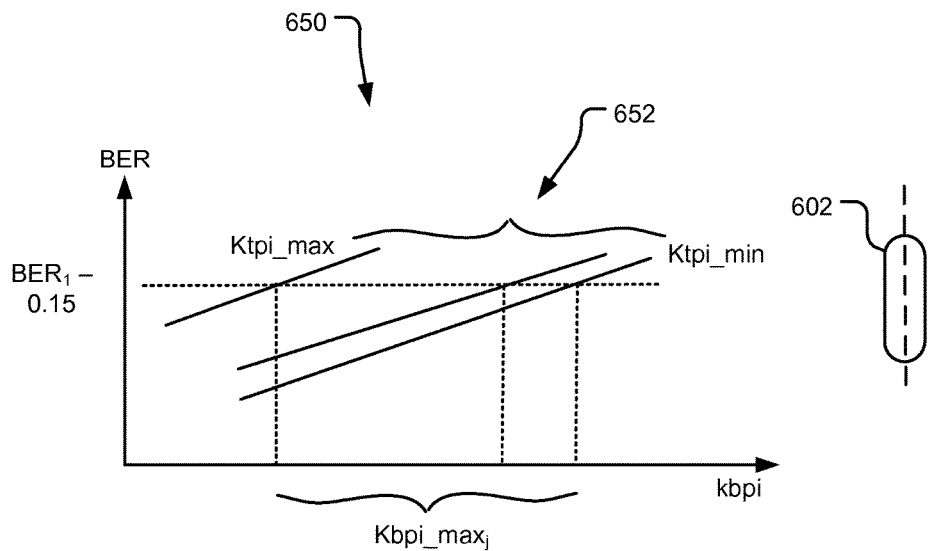
FIG. 6 illustrates example operations for finding maximum linear density for various track densities.
Figure 6:
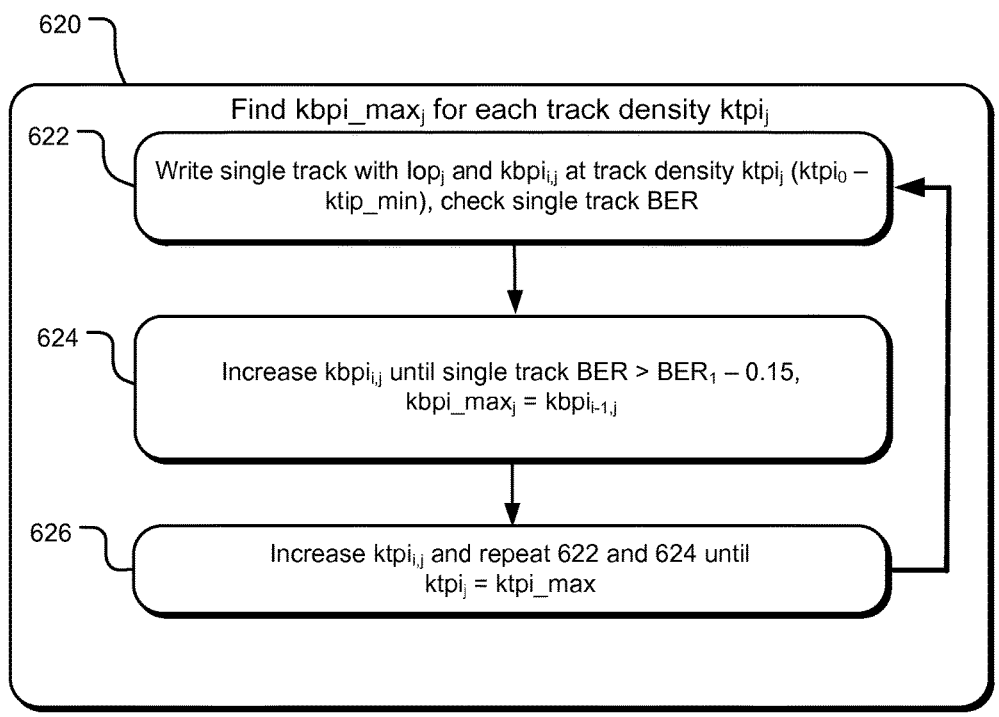

FIG. 6 illustrates operation 406 in further detail. Specifically, FIG. 6 illustrates operations 620 for finding maximum linear density kbpi_$max_j$ for each track density $ktpi_j$. An operation 622 writes a single track 602 with optimized laser power $Iop_j$ and linear density $kbpi_{i,j}$ at track density $ktpi_j$ and checks the single track BER. Here the minimum track density ktpi_min is equal to $ktpi_0$. An operation 624 increases the linear density $kbpi_{i,j}$ until the single track density BER>($BER_1$−0.15). If the linear density is $kbpi_{i,j}$ when the observed BER>($BER_1$−0.15), then the kbpi_$max_j$ is equal to $kbpi_{i-1,j}$. An operation 626 increases $ktpi_j$ and repeats the steps 622 and 624 until $ktpi_j$=ktpi_max. A graph 650 illustrates the operations 620 wherein each line 652 illustrates single track BER over a sweep of kbpi over various values of ktpi (between ktpi_min and ktip_max).

Figure 7:
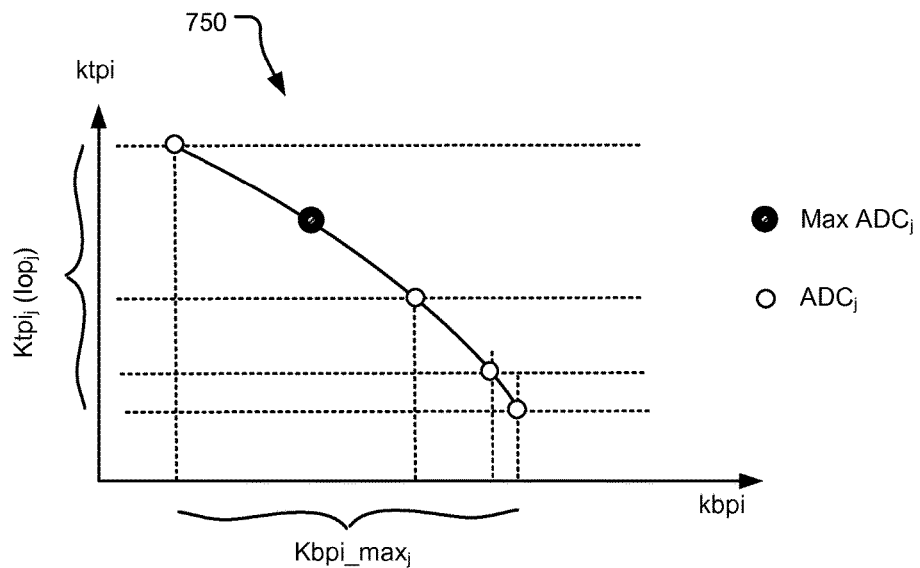
FIG. 7 illustrates example operations for determining IMR track density, even track linear density, and even track laser power.
Figure 7:
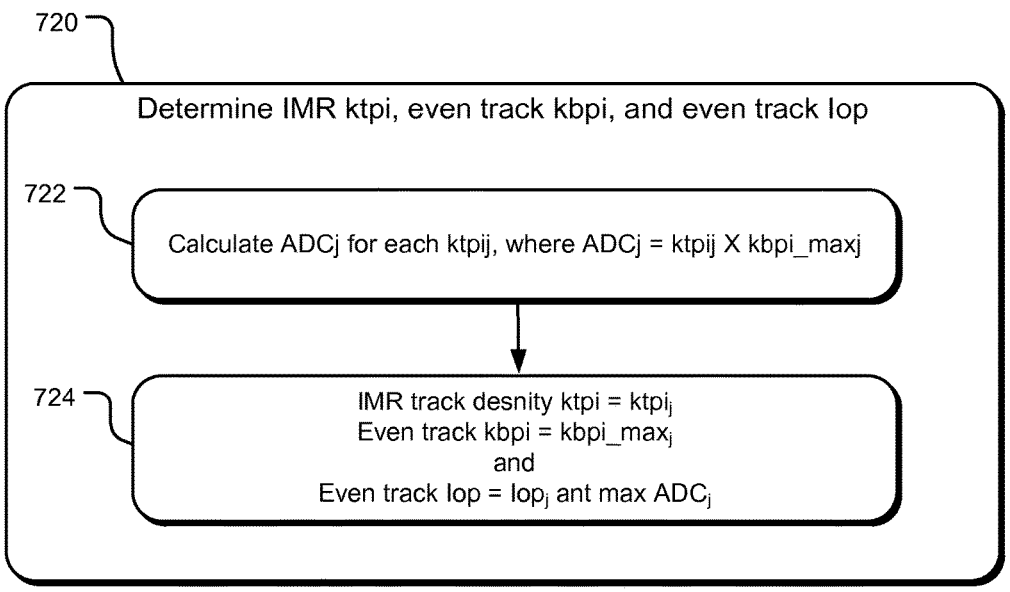

FIG. 7 illustrates operation 408 in further detail. Specifically, FIG. 7 illustrates operations 720 for determining IMR ktpi, even track kbpi, and even track Iop. An operation 722 determines the $ADC_j$ for each $ktpi_j$ as a product of $ktpi_j$ and kbpi_$max_j$. A graph 750 illustrates the relation between the track density and linear density and the resulting ADCj for various combinations thereof. An operation 724 determines the $ktpi_j$, kbpi_$max_j$ and laser power $Iop_j$ at max $ADC_j$ as the IMR ktpi, even track kbpi, and even track Iop.

Figure 8:
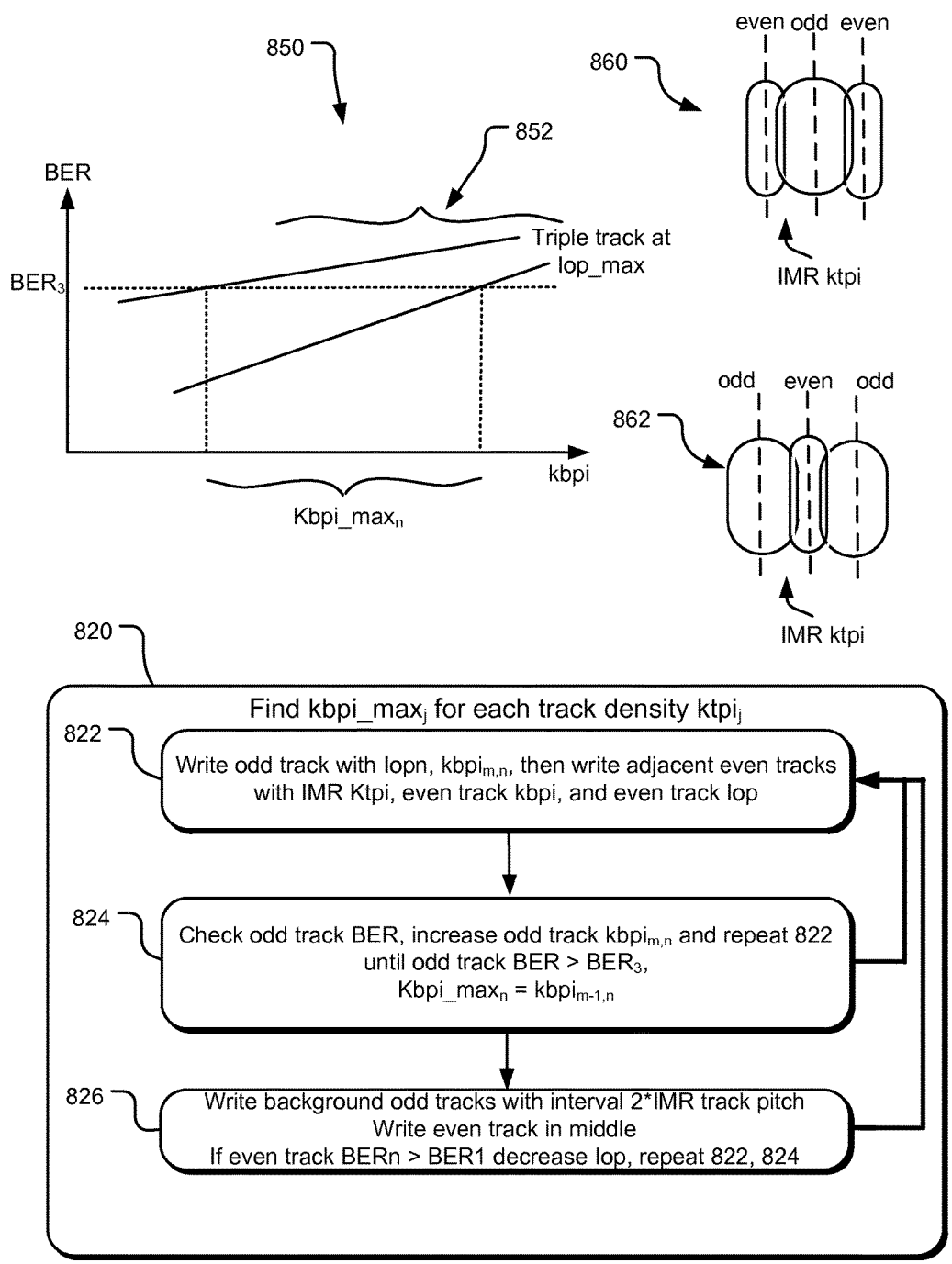
FIG. 8 illustrates example operations for determining odd track linear density and odd track laser power.

FIG. 8 illustrates operation 410 in further detail. Specifically, FIG. 8 illustrates the operations 820 for determining odd track kbpi and odd track Iop. An operation 822 writes an odd track with an initial laser power $Iop_n$ (n=0) and linear density $kbpi_{m,n}$ (m=n=0). Subsequently, it writes two adjacent even tracks on top of to trim the odd track. The even tracks are written with IMR ktpi, even track kbpi, and even track Iop. The operation 822 is illustrated by 860.

Subsequently, an operation 824 checks the odd track BER and repeats the operation 822 with increasing odd track $ktpi_{m,n}$ until the odd track BER is greater than a predetermined $BER_3$. At this point, the kbpi_$max_n$=$kbpi_{m-1,n}$. An operation 826 writes two background odd tracks with an interval of 2*IMR track pitch and then writes an even track in the middle of the background odd tracks, as illustrated by 862. The operation 826 then checks the even track BER (which is referred to as $BER_n$). If one determines that the $BER_n$>a predetermined $BER_1$, then it decreases the laser power $Iop_n$ and repeats the operations 822 and 824 until $BER_n$<$BER_1$. At this point the IMR odd track linear density kbpi is determined to be equal to kbpi_$max_n$ and odd track laser power Iop is determined to be equal to $Iop_n$. A graph 850 illustrates the operations 820 in graphical form. In an implementation using the operations disclosed in FIGS. 4-8, the head writing configuration may be adjusted accordingly to ensure proper head media separation.

Figure 9:
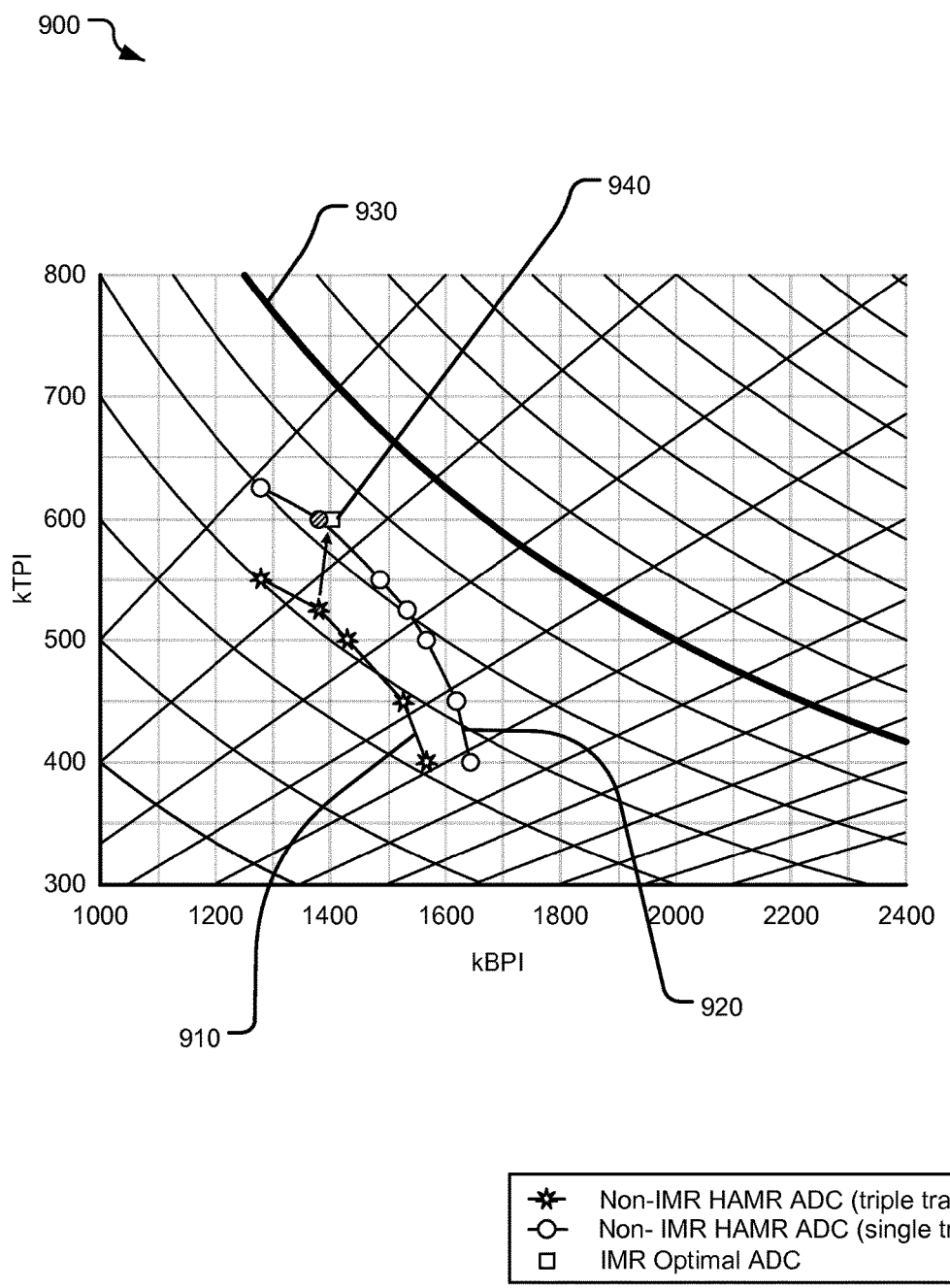
FIG. 9 illustrates an example graph of the ADC achieved using the algorithm illustrated herein.

FIG. 9 illustrates a graph 900 of the ADC achieved using the algorithm illustrated in FIGS. 4-8. Specifically, FIG. 9 illustrates the ADC for various combinations of ktpi (illustrated on y-axis) and kbpi (illustrated on x-axis). A curve 910 illustrates the ADC for various combinations of kbpi/ktpi for a non-IMR HAMR implementation. Whereas a curve 920 illustrates the single track ADC for various combinations of kbpi/ktpi for a non-IMR HAMR implementation (an example of graph 750). The square 940 is the optimal ADC for IMR HAMR by implementing the laser power optimization method disclosed in FIG. 4. As illustrated, for given kbpi, the IMR HAMR implementation is able to achieve higher kTPI, thus resulting in higher ADC for each kbpi. Specifically, an average ADC gains of approximately 16% over the ADC for the non-IMR HAMR implementation is achieved for the IMR HAMR implementation.

The graph 900 also illustrates the combinations of ktpi and kbpi by a line 930 that provides ADC of 1000 Gigabytes per square inch (GBPSI). Thus, the IMR HAMR implementation allows moving closer to the goal of achieving 1000 GBPSI ADC.

Figure 10:
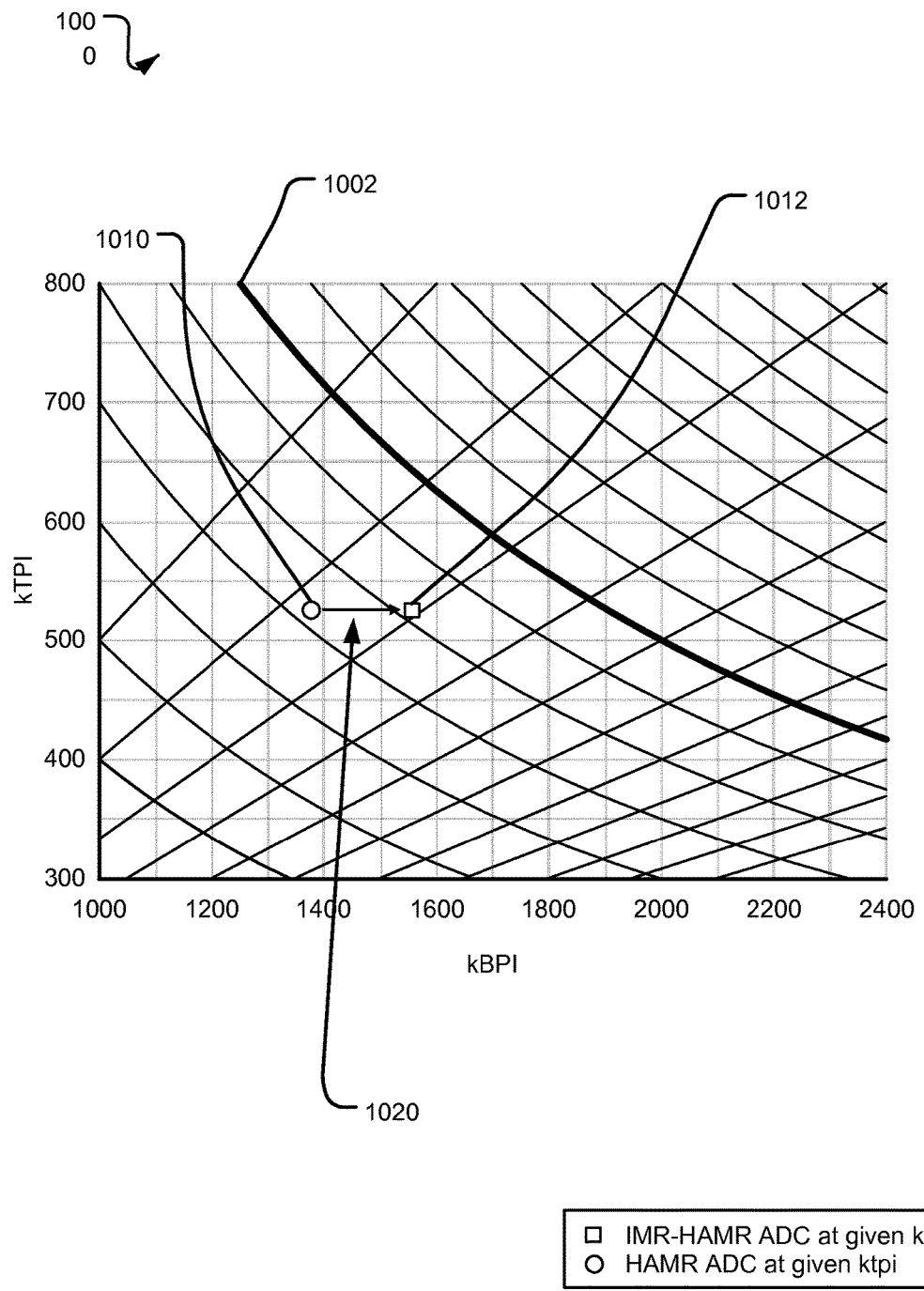
FIG. 10 illustrates an alternative example graph of the ADC achieved using the algorithm illustrated herein.

FIG. 10 illustrates a graph 1000 of the ADC achieved using the algorithm illustrated in FIGS. 4-8. Specifically, the graph 1000 illustrates a solution point 1010 that is the ADC achieved for HAMR ADC at a given ktpi. A solution point 1012 is the ADC achieved using the IMR-HAMR ADC at the same given ktpi. As illustrated, for given ktpi, the kbpi increases by 1020, thus increasing the ADC compared to the non IMR HAMR solution. The graph 1000 also illustrates the combinations of ktpi and kbpi by a line 1002 that provides ADC of 1000 Gigabytes per square inch (GBPSI). Thus, the IMR HAMR implementation allows moving closer to the goal of achieving 1000 GBPSI ADC at given track density ktpi.

Figure 11:
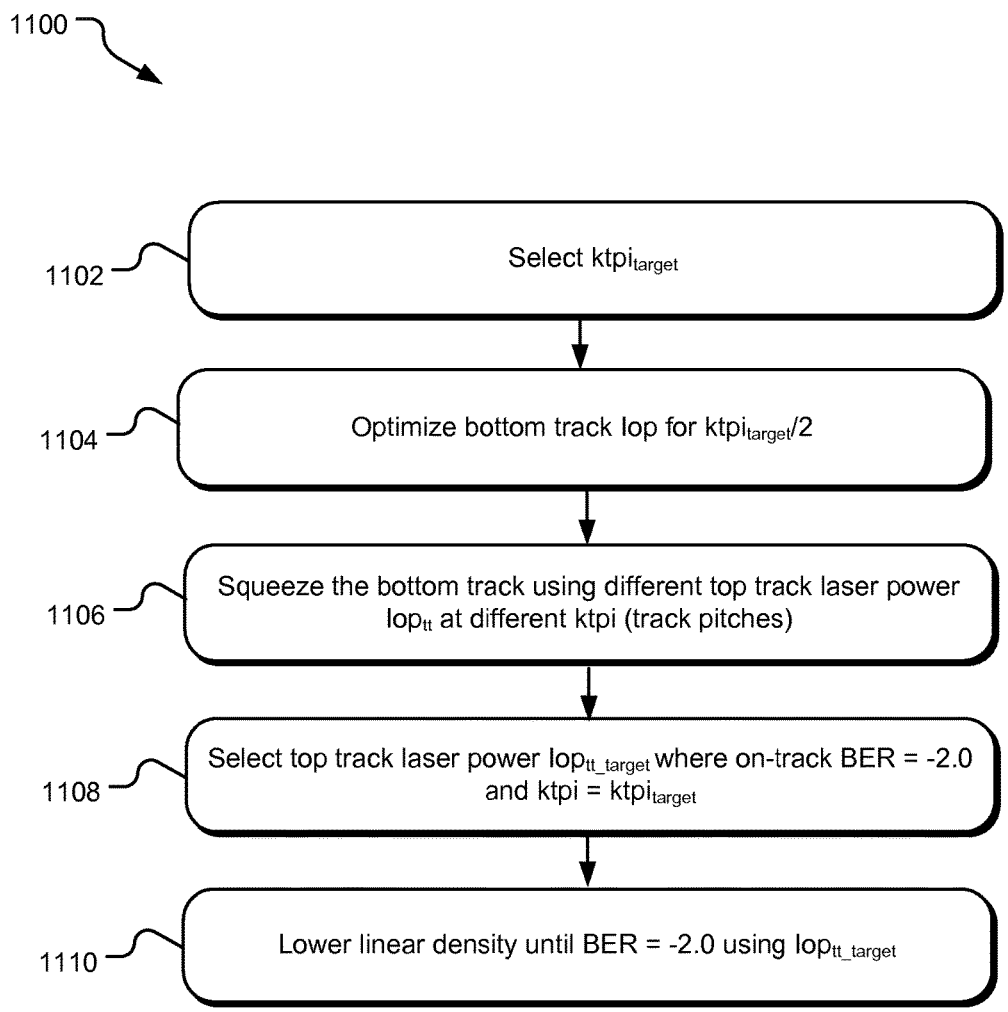
FIG. 11 illustrates an alternative example flowchart for selecting linear densities for even and odd track for IMR-HAMR.

FIG. 11 illustrates an alternative example flowchart 1100 for selecting linear densities for even and odd track for IMR-HAMR. Specifically, the flowchart 1100 illustrates operations for determining the linear densities for even and odd track for IMR-HAMR for a selected track density. An operation 1102 selects a target track density $ktpi_{target}$. For example, the selected $ktpi_{target}$ may be 600. An operation 1104 optimizes the laser power Iop for a bottom (odd) track using triple track BER with ktpi of $ktpi_{target}/2$ (i.e., 300). For example, the operation 1104 may optimize the Iop using on-track BER targeted at −2.3 decades BER. The operation 1104 provides the bottom track Iop. In an implementation using the operations disclosed in FIG. 11, the head writing configuration may be adjusted accordingly to ensure proper head media separation.

Subsequently, an operation 1106 squeezes the bottom track using different top track laser powers $Iop_{tt}$ at a number of different track pitches ktpi. Such squeezing is done using the triple track method described in FIG. 5 where a single bottom track 504 is written and then two adjacent tracks 502 and 506 are written next to 504. The adjacent tracks writes do not need to be limited to 1 write on adjacent tracks 502 and 506 and adjacent tracks 502 and 506 can be written numerous times to build in margin for adjacent track interference. Thus, there may be a large number of combinations of $Iop_{tt}$ and Ktpi for which the operation 1106 may squeeze the bottom track. Such combinations of $Iop_{tt}$ and Ktpi are further disclosed in FIG. 12 below. An operation 1108 selects a top track power $Iop_{tt\_target}$ for which, the on-track BER=−2.0 and the track pitch ktpi is equal to the $ktpi_{target}$ (in this case, 600). Operation 1110 lowers the linear density kbpi using the top track laser power $Iop_{tt\_target}$ determined in operation 1108 until a BER of −2.0 is achieved. The operations disclosed in FIG. 11 results in loss of 0.3 for BER (from −2.0 to −2.3). If it is determined that this loss of BER results in the top track being unrecoverable, the linear density kbpi of the bottom track may have to be reduced further in operation 1110.

Figure 12:
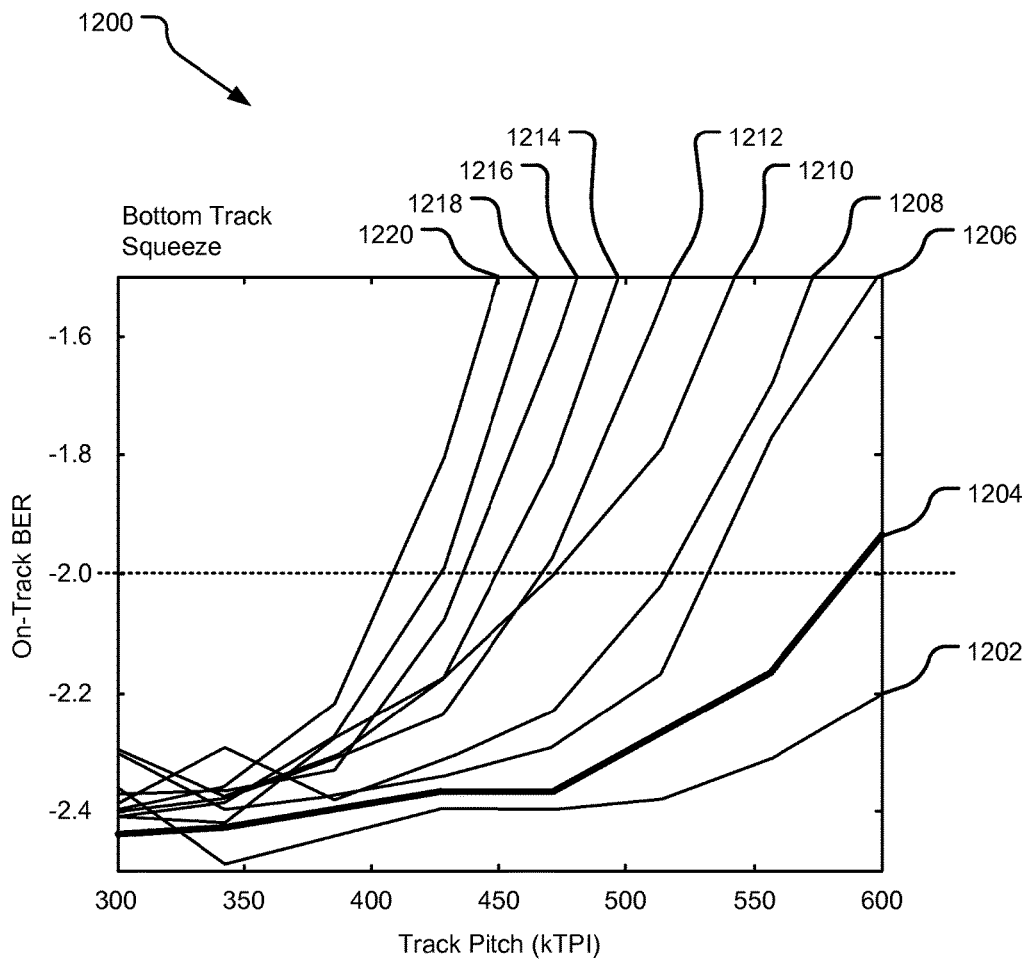
FIG. 12 illustrates an example graph illustrating the operations illustrated in FIG. 11.

FIG. 12 illustrates an example graph 1200 illustrating the operations illustrated in FIG. 11. Specifically, the graph 1200 illustrates bottom track squeeze using various track pitches ktpi (x-axis) for various values of on-track BER (y-axis) and for various values of top track laser power (lines 1202-1220). Each of the lines 1202-1220 is for a specific value of top track laser power $Iop_{tt}$ as listed in 1250 in mA. In the example illustrated by operations in FIG. 11 and by the graph 1200, a top track laser power $Iop_{tt}$ where the on-track BER is −2.0 and track pitch is 600 ktpi is selected. This is illustrated by the line 1204, which corresponds to the $Iop_{tt}$ of 11.74 mA, as illustrated in 1250.

Figure 13:
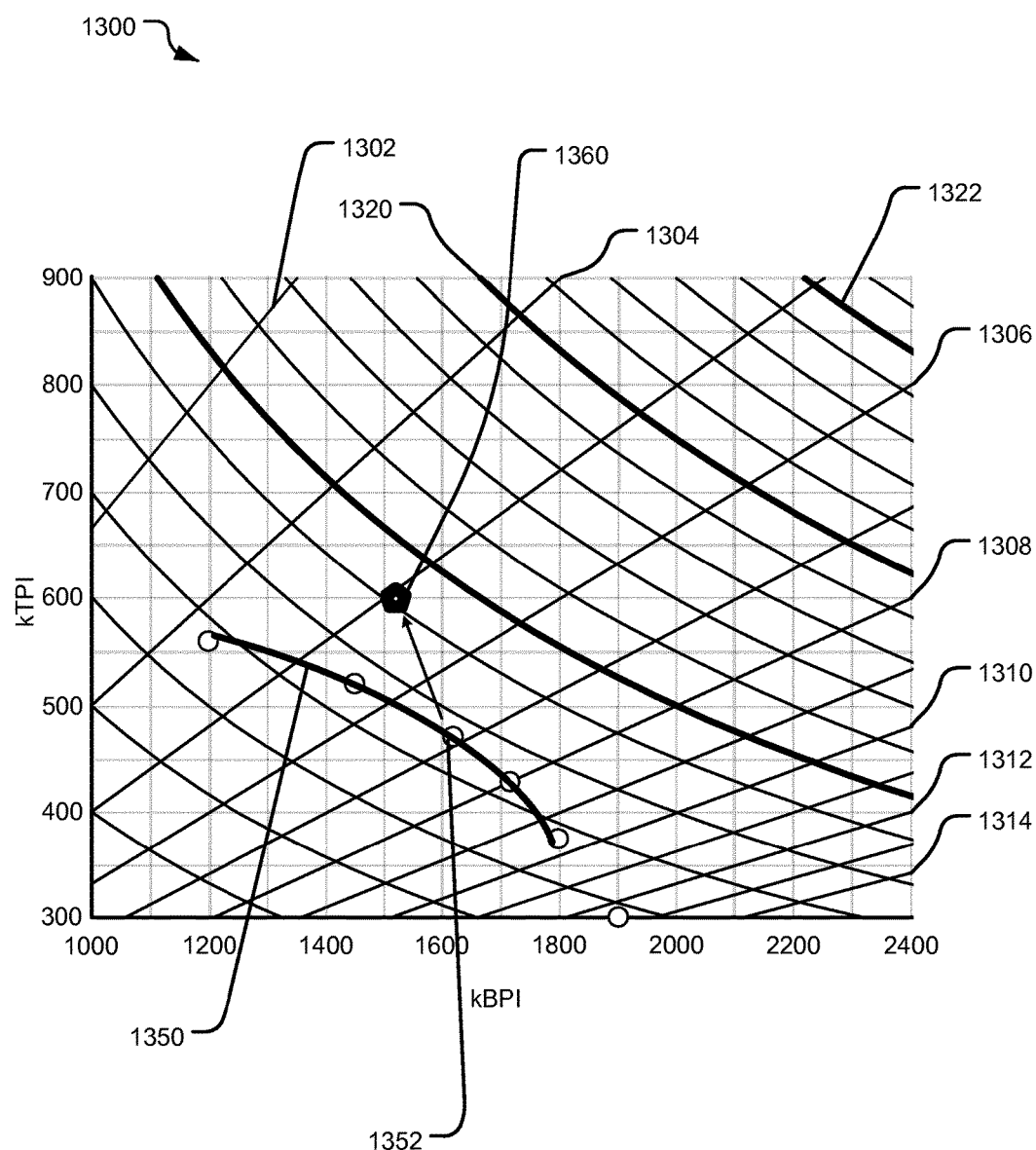
FIG. 13 illustrates a graph of relations between track-pitch and bit error rate (BER) for various power levels using the operations disclosed in FIG. 11.

FIG. 13 illustrates a graph 1300 of relations between track-pitch (kTPI) and track density (kBPI) (for various power levels using the operations disclosed in FIG. 11. Each of the various lines 1302 to 1314 represents relations between track densities ktpi (y-axis) and corresponding linear densities (kbpi) for various bit-aspect ratios (BAR). For example, the line 1304 represents a BAR or 2.0, the line 1308 represents a BAR of 5.0, etc. Each of the curves 1320, 1322, etc., represents isometric ADC line. For example, each point on curve 1320 represents ADC of 1500 GBPSi, each point on curve 1322 represents ADC of 2000 GBPSi, etc.

A curve 1350 connects ADC points corresponding to HAMR heads implemented in conventional non-IMR systems. For example, the point 1352 indicates a best achievable ADC in conventional non-IMR systems. Compared to that, a point 1360 indicates an ADC achievable by implementing a HAMR head in an IMR system according to the disclosed technology of FIGS. 11, 12. As illustrated, by sacrificing the BER of 0.3, the ADC can be increased by as much as 20% (between points 1352 and 1360).

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A storage device comprising:
    a storage media configured to store data using interlaced magnetic recording (IMR) having at least two different track densities (kilotracks per inch (ktpi));
    a power source configured to heat the storage media; and
    a storage device controller configured to determine power levels applied to the power source such that power levels applied to heat various tracks j of different track densities $ktpi_j$ are different from each other by:
        writing triple adjacent tracks at a given linear density and a given track density;
        determining an optimized power level for the given track density based on an observed best center track bit error rate (BER) of the triple adjacent tracks.

2. The storage device of claim 1, wherein the power source is a laser power source.

3. The storage device of claim 1, wherein the storage device controller is further configured to determine the power levels applied of the power source such that the total area density capacity (ADC) of the storage device is maximized.

4. The storage device of claim 3, wherein the storage device is further configured to determine a power level for a given track density by:
    if the observed best center track BER is less than a predetermined BER threshold, increasing the given track density and repeating the writing and the determining operations until the observed best center track BER is greater than the predetermined BER threshold.

5. The storage device of claim 4, wherein writing the triple adjacent tracks further comprises writing a center track first and then writing adjacent outer tracks.

6. The storage device of claim 5, further comprising finding a maximum linear density for each track density.

7. The storage device of claim 6, wherein finding the maximum linear density for each track density further comprises:
    at each particular track density $ktpi_j$, writing a single track with optimized laser power for that particular track density over a range of linear density values (kilobits per inch ($kbpi_{i,j}$)),
    determining the single track BER;
    increasing $kbpi_{i,j}$ until the single track BER is greater than the predetermined BER −0.15; and
    increasing the $ktpi_j$ and repeating the operations of determining single track BER and increasing until $ktpi_j=ktpi\_max$.

8. The storage device of claim 3, further comprising:
    finding power levels for each of the different track densities $ktpi_j$;
    finding a maximum linear density (kilobits per inch ($kbpi\_max_j$)) for each of the different track densities $ktpi_j$;
    determining IMR track density ktpi, IMR even track linear densities kbpi, and IMR even track operating power levels; and
    determining IMR odd track linear densities kbpi and IMR odd track operating power levels.

9. The storage device of claim 8, further comprising determining area density capacity $ADC_j$ for each given track density $ktpi_j$ as a product of given track density $ktpi_j$ and maximum linear density $kbpi\_max_j$ for the given track density $ktpi_j$.

10. The storage device of claim 9, wherein the linear density of even track is the maximum linear density $kbpi\_max_j$ where the ADC value is equal to maximum value of ADC $max\_ADC_j$.

11. The storage device of claim 8, wherein determining IMR odd track linear densities kbpi further comprises:
    writing an odd track with laser power of $Iop_{n=0}$ and odd track linear density of $kbpi_{m=0,n=0}$;
    writing two adjacent even tracks with IMR track density ktpi, IMR even track linear densities kbpi, and IMR even track operating power levels;
    increasing odd track linear density until odd track BER>$BER_3$ and repeating the operations of writing an odd track and writing two adjacent even tracks, wherein the $BER_3$ is a predetermined BER threshold.

12. The storage device of claim 8, wherein determining IMR odd track operating power levels further comprises:
    writing two background odd tracks with interval of 2*IMR track pitch with laser power of $Iop_n$;
    writing an even track between the two background odd tracks with laser power of $Iop_n$; and
    decreasing the laser power until even track BER>$BER_1$ and repeating the writing of the two background odd tracks and the even track between the two background odd tracks, wherein the $BER_1$ is a predetermined BER threshold.

13. A method comprising:
    determining laser power levels applied to a laser power source of a storage device storing data on storage media using interlaced storage recording (IMR) such that laser power levels applied to heat various tracks can be different from each other; by:
    writing triple adjacent tracks at a given linear density and a given track density; and
    determining an optimized power level for each of a plurality of track densities based on observed best center track bit error rate (BER) of the triple adjacent tracks.

14. The method of claim 13, wherein determining the laser power levels further comprises determining the laser power levels such that the total area density capacity (ADC) of the storage device is optimized.

15. The method of claim 13, further comprising determining a power level of a given track density by:
    if the observed best center track BER is less than a predetermined BER threshold, increasing the given track density and repeating the writing and the determining operations until the observed best center track BER is greater than the predetermined BER threshold.

16. The method of claim 15, wherein writing the triple adjacent tracks further comprises writing a center track first and them writing adjacent outer tracks.

17. The method of claim 16, further comprising finding a maximum linear density for each track density.

18. The method of claim 17, wherein finding the maximum linear density for each track density further comprises:
    at each particular track density (kilotracks per inch ($ktpi_j$)), writing a single track with optimized laser power for that particular track density over a range of linear density values (kilobits per inch ($kbpi_{i,j}$)),
    measuring the single track BER;
    increasing $kbpi_{i,j}$ until the single track BER is greater than the predetermined BER−0.15; and
    increasing the ktpi and repeating the operations of determining single track BER until $ktpi_j=ktpi\_max$.

19. The method of claim 14, further comprising:
    finding power levels for each of the different track densities kilotracks per inch ($ktpi_j$);
    finding a maximum linear density kilobits per inch ($kbpi\_max_j$) for each of the different track densities $ktpi_j$;
    determining IMR track density ktpi, IMR even track linear densities kbpi, and IMR even track operating power levels; and
    determining IMR odd track linear densities kbpi and IMR odd track operating power levels.

20. The method of claim 19, further comprising determining area density capacity for each given track density $ktpi_j$ as a product of given track density $ktpi_j$ and maximum linear density $kbpi\_max_j$ for the given track density $ktpi_j$.

* * * * *